United States Patent
Lee et al.

(10) Patent No.: US 7,613,261 B2
(45) Date of Patent: Nov. 3, 2009

(54) METHOD OF ESTIMATING SYMBOL SYNCHRONIZATION IN OQPSK DEMODULATOR

(75) Inventors: Hyun Suk Lee, Kyungki-Do (KR); Sang Hyun Min, Kyungki-Do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 616 days.

(21) Appl. No.: 11/535,299

(22) Filed: Sep. 26, 2006

(65) Prior Publication Data

US 2007/0076823 A1 Apr. 5, 2007

(30) Foreign Application Priority Data

Sep. 30, 2005 (KR) .................. 10-2005-0092040

(51) Int. Cl.
*H04L 7/00* (2006.01)
(52) U.S. Cl. ....................... 375/354; 375/331
(58) Field of Classification Search ............ 375/354, 375/332, 329, 279, 280, 281, 149, 159, 142, 375/145

See application file for complete search history.

(56) References Cited

U.S. PATENT DOCUMENTS

2008/0101442 A1* 5/2008 Rasmussen ............. 375/148

FOREIGN PATENT DOCUMENTS

EP 1134928 A1 9/2001

* cited by examiner

*Primary Examiner*—Kevin Y Kim
(74) *Attorney, Agent, or Firm*—Lowe Hauptman Ham & Berner, LLP (57) ABSTRACT

The present invention relates to a method of estimating symbol synchronization for an Offset Quadrature Phase Shift Keying (OQPSK) demodulator applicable to a Zigbee receiver. More particularly, the invention relates to a method of recovering symbol synchronization of an OQPSK demodulator in which a reference correlation value is reset using a correlation value of a reception signal when detecting symbol synchronization in the OQPSK demodulator, preventing errors in detecting symbol synchronization due to noise, thereby increasing the accuracy in symbol synchronization.

7 Claims, 6 Drawing Sheets

METHOD OF ESTIMATING SYMBOL SYNCHRONIZATION IN OQPSK DEMODULATOR

CLAIM OF PRIORITY

This application claims the benefit of Korean Patent Application No. 2005-92040 filed on Sep. 30, 2005, in the Korean Intellectual Property Office, the disclosure of which is incorporated herein by reference.

BACKGROUND OF THE INVENTION

1. Field of the Invention

The present invention relates to a method of estimating symbol synchronization for an Offset Quadrature Phase Shift Keying (OQPSK) demodulator applicable to a Zigbee receiver. More particularly, the invention relates to a method of recovering symbol synchronization of an OQPSK demodulator in which a reference correlation value is reset using a correlation value of a reception signal when detecting symbol synchronization in the OQPSK demodulator, preventing errors in detecting symbol synchronization due to noise, thereby increasing the accuracy in symbol synchronization.

2. Description of the Related Art

Recently, "ubiquitous" meaning a communication environment in which one can connect to a network at any time any place has been suggested. Thus, there have been active researches under way on small-scale wireless communication systems, for example, Wireless Local Area Networks (WLANs), Wireless Personal Area Networks (WPANs), sensor networks and Radio Frequency Identification (RFID) rather than large-scale wireless communication network systems such as cellular networks.

Of these wireless communication systems, the WPAN and/or the sensor network in particular require ultra-small size, low power consumption and low cost in addition to effective communication performance. Thus, it is difficult to apply high-capacity, high-cost equipment and components used in the existing cellular communication systems or WLAN systems to the wireless communication systems such as the WPAN. Conversely, in case of adopting low-cost components to reduce the cost, there may be large phase or frequency offsets occurring in the receiver, thus requiring a solution therefor.

Therefore, there should be researched and developed a demodulator which performs well without needing expensive equipments or products in a communication system environment. In particular, a receiver for receiving OQPSK symbol packets needs to execute symbol synchronization more accurately.

Figure 1:
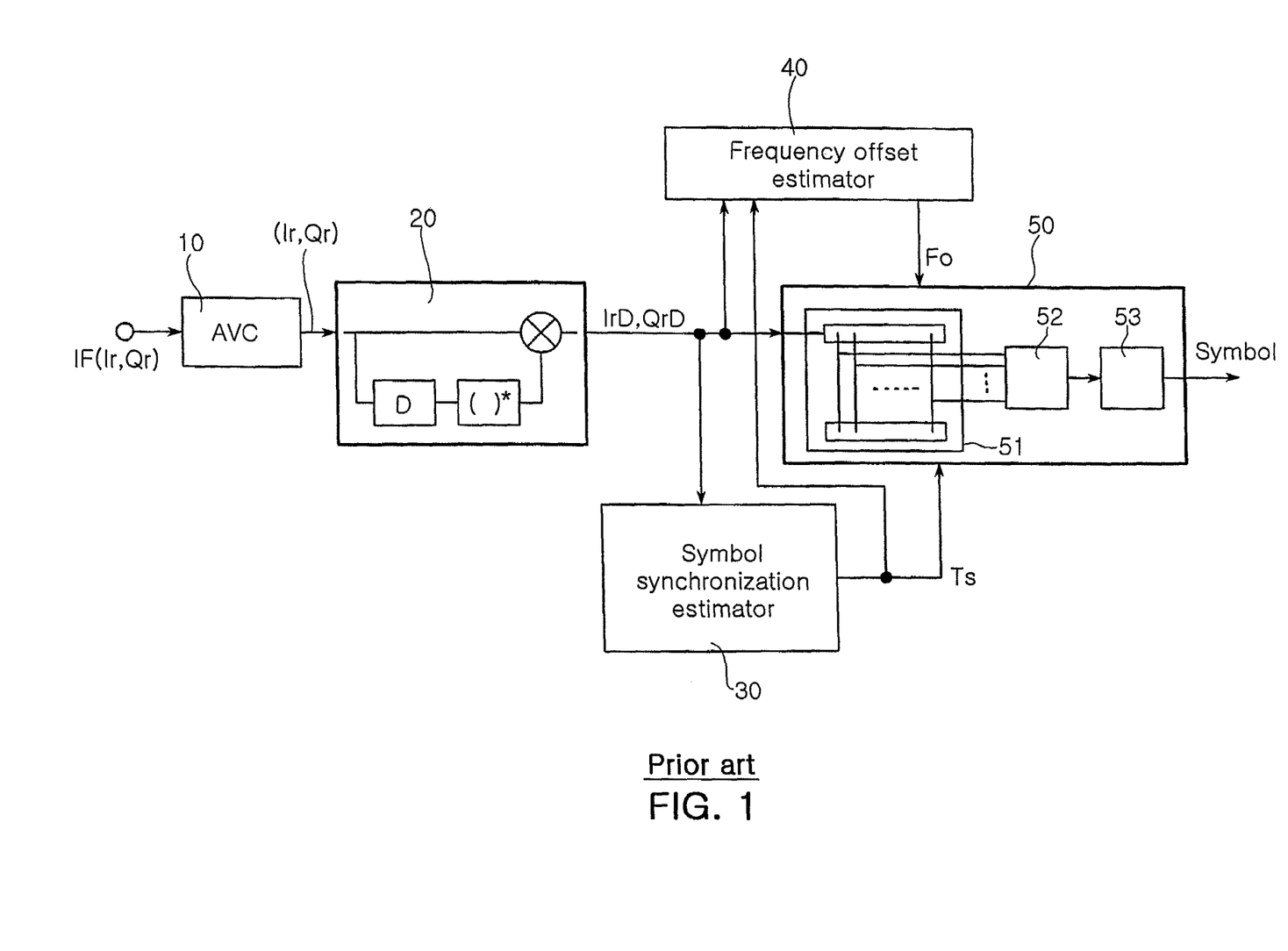
FIG. 1 is a block diagram illustrating a conventional OQPSK demodulator.

FIG. 1 is a block diagram illustrating a conventional OQPSK demodulator.

The conventional OQPSK demodulator shown in FIG. 1 includes an A/D converter (ADC) 10, a multiple differentiator 20, a symbol synchronization estimator 30, a frequency offset estimator 40 and a correlator 50. The ADC 10 converts an Intermediate Frequency (IF) signal of a receiver into a digital signal Ir and Qr, and the multiple differentiator 20 differentiates the digital signal Ir and Qr from the ADC 10 to minimize the influence of noise in producing a correlation value. The symbol synchronization estimator 30 executes self-correlation for the differentiated signal IrD and QrD from the multiple differentiator 20 to estimate symbol synchronization. The frequency offset estimator 40 estimates frequency offset for the differentiated signal IrD and QrD from the multiple differentiator 20 using a symbol synchronization signal Ts of the symbol synchronization estimator 30. The correlator 50 detects a symbol based on the correlation value of the differentiated signal IrD and QrD from the multiple differentiator 20, in synchronization with the symbol synchronization signal Ts and the frequency offset signal Fo.

The correlator 50 includes a multiplier 51, a maximum value detector 52 and a symbol detector 53. The multiplier 51 operates in synchronization with the symbol synchronization signal Ts and the frequency offset signal Fo, and correlates the differentiated signal IrD and QrD from the multiple differentiator 20 with a reference signal of each of PN sequences to output correlation values for chip signals. The maximum value detector 52 adds up the individual correlation values of the chip signals for each PN sequence, and finds the greatest correlation value out of the added correlation values. The symbol detector 53 detects a symbol that corresponds to the greatest correlation value detected by the maximum correlation value detector 52.

Here, a time point of the symbol synchronization needs to be accurately estimated by the symbol synchronization estimator 30 in order to allow more accurate symbol detection by the correlator 50. The symbol synchronization estimator 30 will be explained hereunder with reference to FIG. 2.

Figure 2:
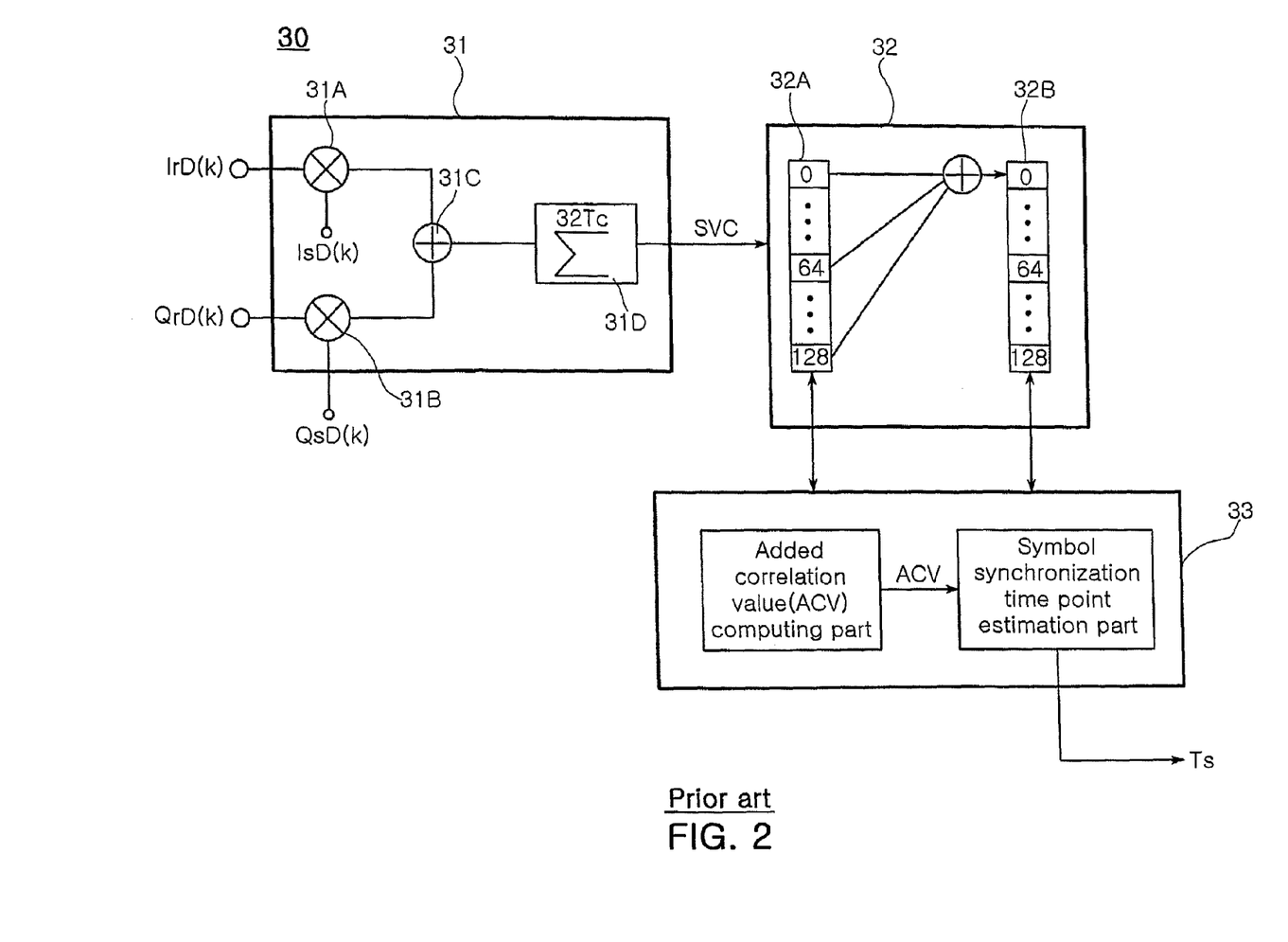
FIG. 2 is a block diagram illustrating a conventional symbol synchronization estimator.

FIG. 2 is a block diagram of a conventional symbol synchronization estimator.

The conventional symbol synchronization estimator 30 shown in FIG. 2 includes a self-correlator 31, a buffer 32 and a symbol synchronization estimation part 33. The self-correlator 31 acquires correlation values of the differentiated signals IrD and QrD and corresponding reference signals IsD and QsD from the multiple differentiator, and adds up the correlation values for each symbol unit to obtain self-correlation values (SCVs). The buffer 32 stores the SCVs from the self-correlator 31, and stores added correlation values (ACVs) acquired using the SCVs. The symbol synchronization estimation part 33 adds the SCVs in the same positions of the preset number of symbols, out of the SCVs of the buffer 32, to acquire the ACVs, and detects a time point when an ACV is greater than a preset reference correlation value to determine the time point of symbol synchronization. Then the symbol synchronization estimation part 33 outputs the symbol synchronization signal Ts at the time point of the synchronization.

The self-correlator 31 includes a first multiplier 31A, a second multiplier 31B, an adder 31C and an integrator 31D. The first multiplier 31A acquires a correlation value between the I signal IrD of the differentiated signal from the multiple differentiator 20 and the corresponding reference signal IsD. The second multiplier 31B acquires a correlation value between the Q signal QrD of the differentiated signal from the multiple differentiator 20 and the corresponding reference signal QsD. The adder 31C adds the correlation value for the I signal from the first multiplier 31A and the correlation value for the Q signal from the second multiplier 31B. The integrator 31D integrates the added I and Q correlation value from the adder 31C for each symbol period 32Tc to acquire the SCV which is a correlation value for each symbol.

Here, 1Tc corresponds to a period of one chip, and 32Tc corresponds to a period for one symbol having 32 chips.

The process of symbol synchronization estimation executed at the symbol synchronization estimation part 33 will be explained hereunder with reference to FIG. 3.

Figure 3:
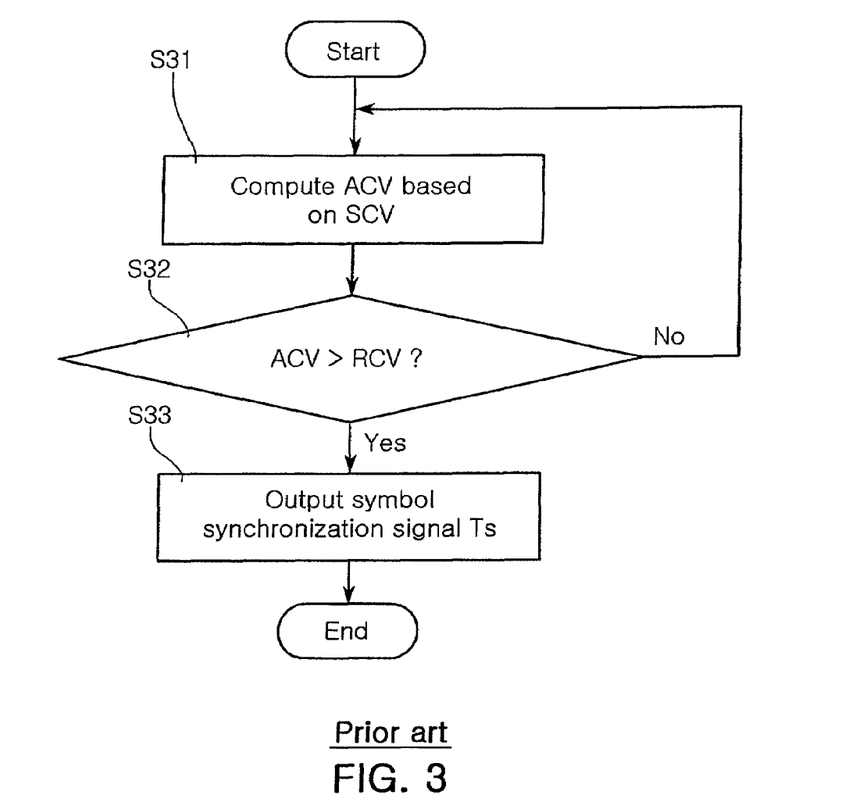
FIG. 3 is a flow chart showing a conventional process of symbol synchronization estimation.

FIG. 3 is a flow chart showing the process of conventional symbol synchronization estimation.

As shown in FIG. 3, examining the conventional symbol synchronization estimation process, the ACVs are acquired based on the SCVs from the self-correlator 31 in a step S31, the ACV and a preset RCV are compared in the next step S32. In the next step S33, if the ACV is smaller than the RCV, the step of acquiring the ACV is repeated, and if the ACV is greater than the RCV, the symbol synchronization signal Ts is outputted.

However, in such a conventional process of symbol synchronization estimation, since a fixed reference correlation value is used, the correlation value of the signal may be greater than the fixed reference correlation value due to noise. This disadvantageously results in errors in symbol synchronization estimation.

SUMMARY OF THE INVENTION

The present invention has been made to solve the foregoing problems of the prior art and therefore an object of certain embodiments of the present invention is to provide a method of recovering symbol synchronization in an OQPSK demodulator, in which a step of resetting a reference correlation value using a correlation value of a reception signal is added to the process of estimating symbol synchronization in the OQPSK demodulator applicable to a Zigbee receiver, preventing errors in detecting symbol synchronization due to noise, thereby improving accuracy of symbol synchronization.

According to an aspect of the invention for realizing the object, there is provided a method of estimating symbol synchronization in an Offset Quadrature Phase Shift Keying (OQPSK) demodulator, including steps of:

(i) correlating a digital reception signal with a preset reference symbol to acquire self-correlation values sequentially for individual symbol units;

(ii) adding, out of the self-correlation values included in a plurality of symbol periods, each of the self-correlation value in due order in an arbitrary symbol and at least one other self-correlation value set apart by a symbol period from a time point of the self-correlation value to acquire an added correlation value;

(iii) comparing between the added correlation value and the reference correlation value as to which is greater;

(iv) detecting a maximum correlation value out of added correlation values included in a plurality of subsequent symbols from a time point where the added correlation value is greater than the reference correlation value;

(v) setting a value corresponding to a predetermined proportion of the maximum added correlation value as a new reference correlation value;

(vi) comparing between a subsequent added correlation value and the new reference correlation value as to which is greater; and (vii) estimating a time point at which the self-correlation value is greater than the new reference correlation value as a time point of synchronization and outputting a symbol synchronization signal at the time point of synchronization.

The step (ii) comprises adding self-correlation values in the same positions of 2 to 5 symbols to acquire the added correlation value.

The step (ii) comprises adding self-correlation values in the same positions of 3 symbols to acquire the added correlation value.

In the step (iv), the number of subsequent symbols are set to be 1 to 3.

In the step (iv), the number of subsequent symbols are set to be 2.

The step (v) comprises setting a value corresponding to an arbitrary proportion, ranging from 60% to 90% of the maximum added correlation value, as the new reference correlation value.

The step (v) comprises setting a value corresponding to an arbitrary proportion, which is up to 75% of the maximum added correlation value, as the new reference correlation value.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described in detail with reference to the accompanying drawings. The same reference numerals will be used to designate the components having the same configurations and functions throughout the drawings.

Figure 4:
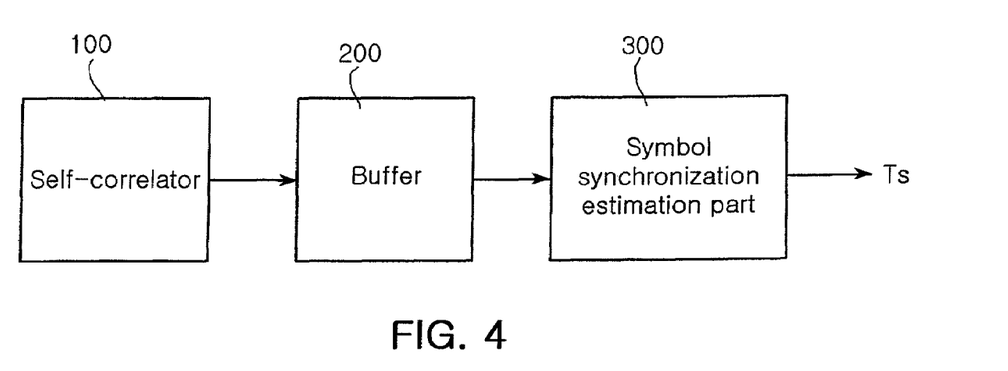
FIG. 4 is a block diagram illustrating a symbol synchronization estimator for executing the process of estimating symbol synchronization according to the present invention.

FIG. 4 is a block diagram illustrating a symbol synchronization estimator for executing the process of estimating symbol synchronization according to the present invention.

With reference to FIG. 4, the symbol synchronization estimator for executing the process of the present invention includes a self-correlator 100, a buffer 200 and a symbol synchronization estimation part 300. The self-correlator 100 correlates the differentiated signal from the multiple diffrentiator 20 in FIG. 1 with a corresponding reference signal to acquire and add up I and Q correlation values, and sums the added I and Q correlation values for individual symbol units to acquire self-correlation values (SCVs). The buffer 200 stores the SCVs from the self-correlator 100 and stores added correlation values (ACVs) acquired using the SCVs. The symbol synchronization estimation part 300 adds up the SCVs in the same positions of the preset number of symbols, out of the SCVs of the buffer 200, to acquire the ACVs. If an ACV is greater than a reference correlation value (RCV), the symbol synchronization estimation part 300 finds a maximum added correlation value (ACVmax) in the preset number of subsequent symbols. Using the ACVmax, the symbol synchronization estimation part 300 sets a new reference correlation value (RCVnew). Next, the symbol synchronization part 300 determines the time point where the ACV is greater than the RCVnew as the time point of symbol synchronization and outputs a symbol synchronization signal Ts at the time point of the synchronization.

With this construction, the present invention can be applied to an OQPSK demodulator following the process of sampling by an A/D converter shown in FIG. 1. The method of the present invention is for estimating symbol synchronization using over-sampled SCVs included in a plurality of symbols and is executed in the symbol synchronization estimation part 300. The process of estimating symbol synchronization in the symbol synchronization estimation part 300 will be explained hereunder in detail with reference to FIG. 5.

Figure 5:
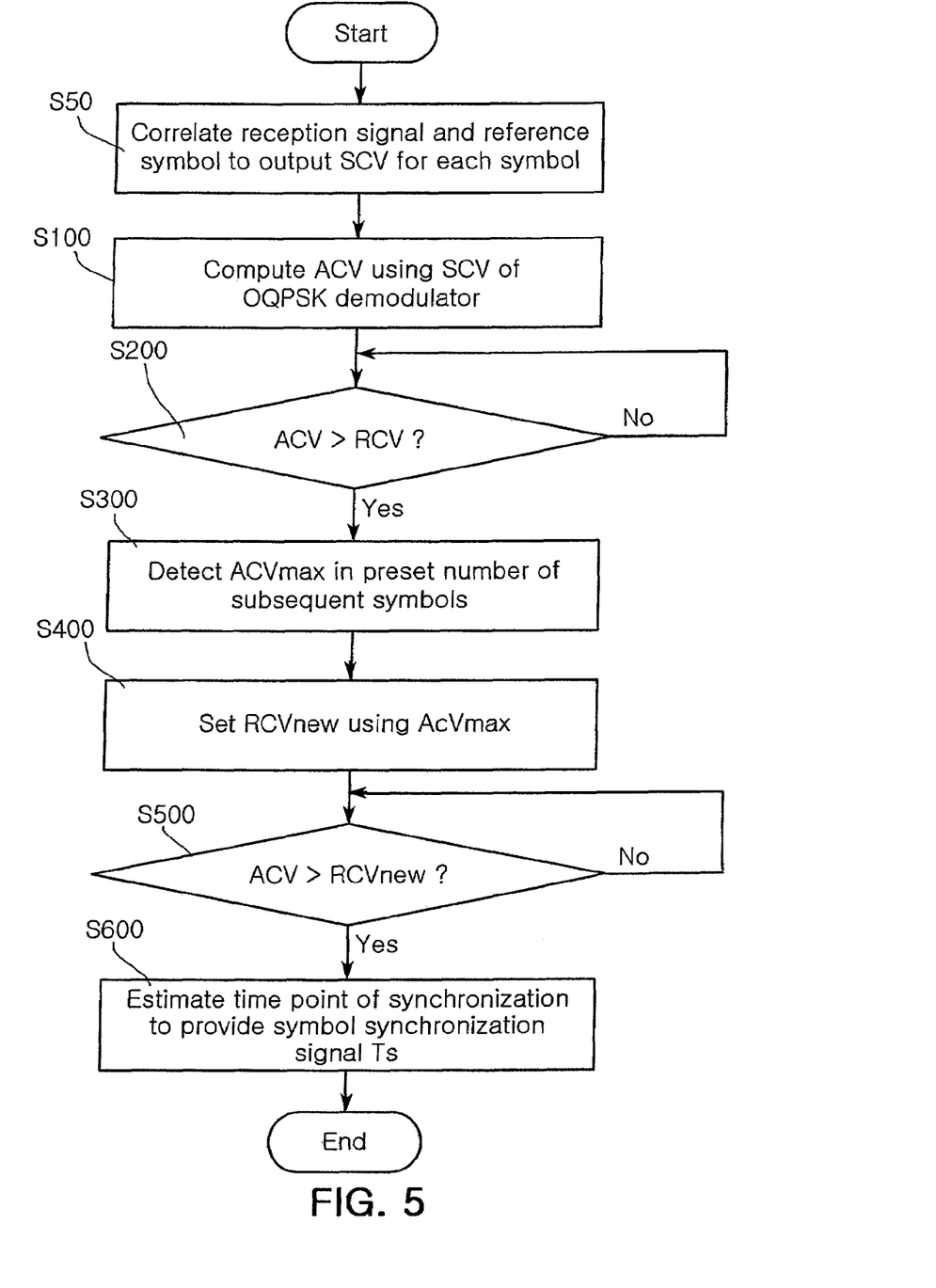
FIG. 5 is a flow chart showing the process of estimating symbol synchronization according to the present invention.
Figure 6:
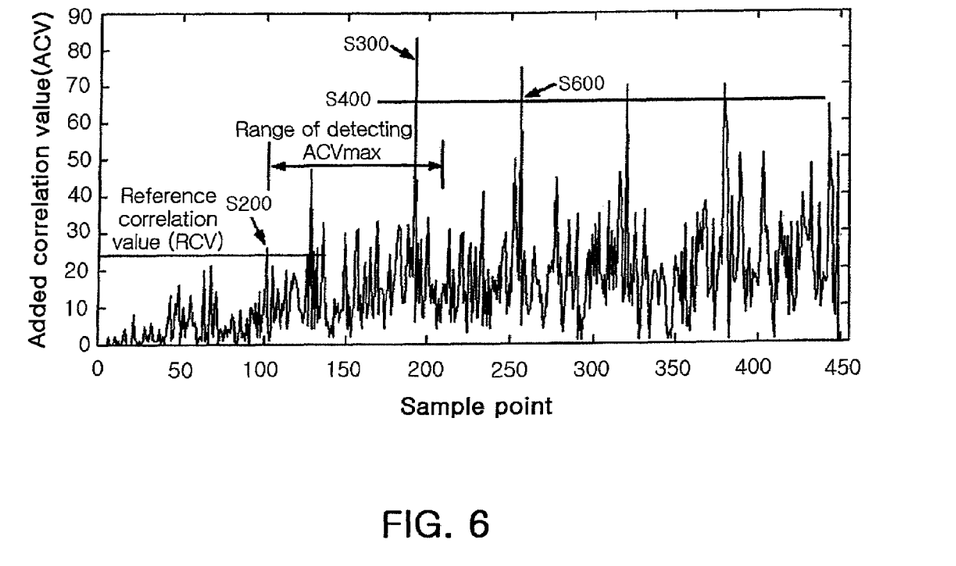
FIG. 6 is a waveform diagram of an added correlation values (ACVs) for explaining the process of symbol synchronization estimation according to the present invention.

FIG. 5 is a flow chart showing the method of estimating symbol synchronization according to the present invention, and FIG. 6 is a waveform diagram of the ACVs for explaining the process of estimating symbol synchronization according to the present invention.

With reference to FIGS. 4 to 6, in a step S50 of self-correlation, a digital reception signal is correlated with a preset reference symbol to acquire SCVs sequentially for individual symbol units.

As described above, the self-correlator 100 shown in FIG. 4 acquires a correlation value between I signal IrD of a differentiated reception signal and a corresponding reference signal IsD, acquires a correlation value between Q signal QrD and a corresponding reference signal QsD, and adds up the correlation value for the I signal and the correlation value for the Q signal. Then, the self-correlator 100 integrates the added I and Q correlation values for each symbol period (32Tc) to acquire the SCV which is a correlation value for each symbol. Here, 1Tc corresponds to a period of one chip, and 32Tc corresponds to a period of one symbol having 32 chips.

Next, in a step S100 of computing ACVs, out of a plurality of SCVs included in a plurality of symbol periods, each of the SCVs in due order in an arbitrary symbol and at least one other SCV set apart by a symbol period from the time point of the one SCV, are added. Here, as mentioned above, the plurality of SCVs included in 2 to 5 symbol periods can be added together to acquire the ACVs.

For example, in case where the preset number of symbols is set to be 3, that is, there are three symbols including successive first to third symbols, each of the SCVs in the last position of each symbol, i.e., each of the SCVs corresponding to '0' position in the first symbol, '64' position in the second symbol and '128' position in the third symbol are added to acquire an added value, which is determined as the SCV for '0'.

Using the same method, a plurality of ACVs are acquired from '1' sample position to '64' sample position, shifting the symbol position one by one. The plurality of ACVs acquired as such are stored in the buffer 200.

Typically a symbol includes 32 chips, but in order for an accurate recovery of a signal, over-sampling in which two samplings are conducted for one chip can be applied. Thus, generally in a receiver, two sample signals exist per one chip in each symbol, and therefore a total of 64 sampling signals are included in a symbol.

Next, in a step S200 of comparison, the ACVs and a preset reference value (RCV) are compared. That is, each of the ACVs stored in the buffer 200 is continuously acquired for each received signal. Of these ACVs acquired as such, a value greater than the RCV is detected (see S200 in FIG. 6).

Next, in a step S300 of detecting a maximum added correlation value (ACVmax), if an ACV is greater than the RCV, i.e., there exists a greater ACV than the RCV, the ACVmax is detected out of the ACVs included in the preset number of subsequent symbols from the time point of detection, in order for a more accurate determination of the time point of symbol synchronization (see S300 in FIG. 6). Here, the preset number of subsequent symbols can be set to be 1 to 3.

For example, in case of setting the number of subsequent symbols to be 2, the ACVmax is detected from a total of 128 ACVs which is the sum of 64 for one symbol and another 64 for the next symbol.

Then, in a step S400 of setting a reference correlation value (RCV), a value corresponding to a certain proportion of the ACVmax is set as a new reference correlation value (RCVnew). Here, the value corresponding to an arbitrary proportion from 60% to 90% of the ACVmax can be set as the RCVnew.

For example, in case of setting an arbitrary proportion up to 75% of the ACVmax as the RCVnew, if the maximum value is detected to be 85, the RCVnew becomes 64 (85×75%) as shown in FIG. 6 (see S400 in FIG. 6).

Through such a process, an RCVnew is reset for each packet to reduce errors in detecting the time point of synchronization due to noise.

Next, in a step S500 of comparison, after the RCVnew is set as above, each of subsequent ACVs and the RCVnew are compared continuously. Then, in the next step S600 of estimating the time point of synchronization, a time point where an ACV is greater than the RCVnew is determined as the time point of synchronization. The symbol synchronization signal Ts is outputted at this time point of synchronization to the correlator 50 shown in FIG. 1, thereby allowing more accurate symbol detection at the correlator 50.

Figure 7:
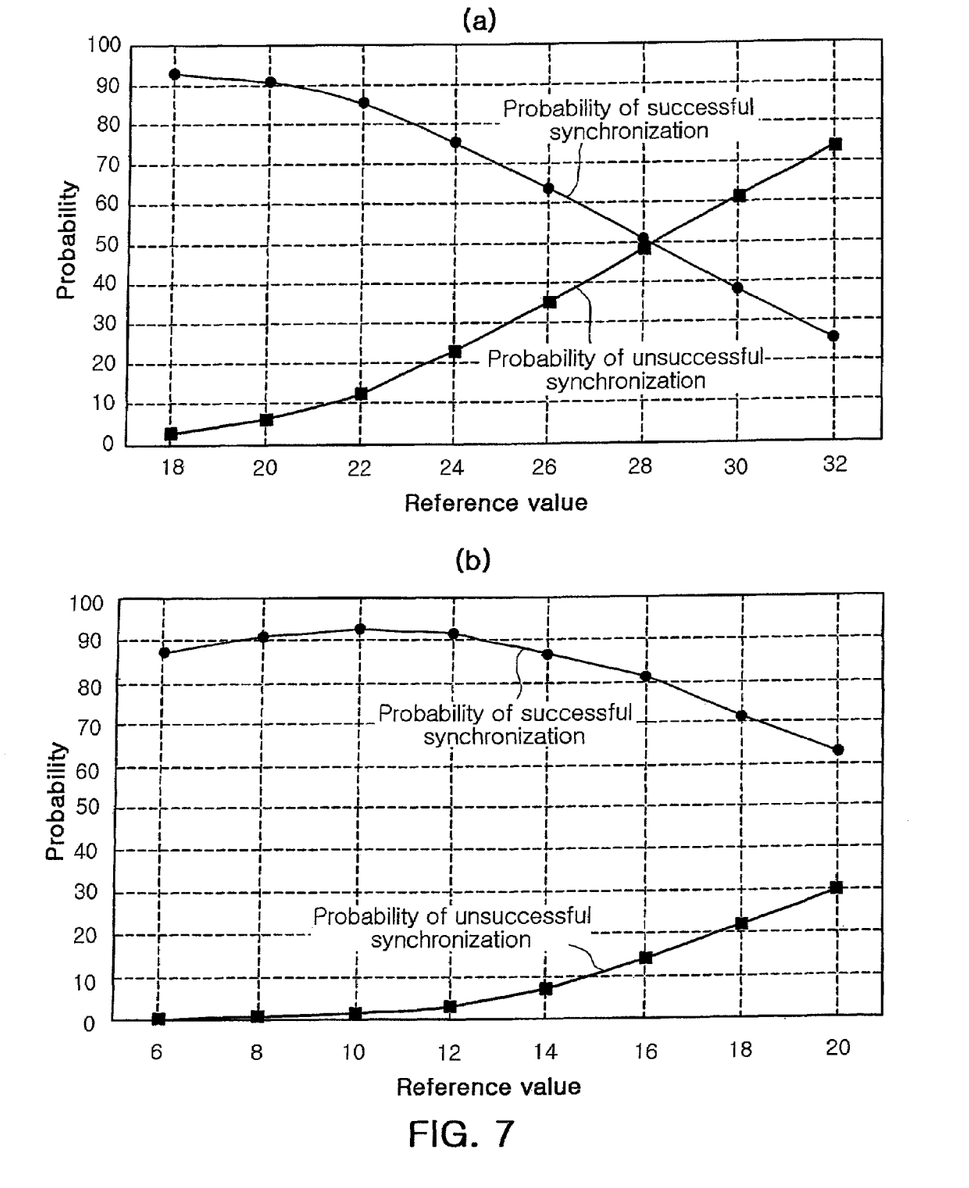
FIG. 7*a* is a graph showing probability of successful synchronization according to the prior art.
FIG. 7*b* is a graph showing probability of successful synchronization according to the present invention.

FIG. 7a is a graph showing the probability of successful synchronization according to the prior art, and FIG. 7b is a graph showing the probability of successful synchronization according to the present invention.

With reference to the plots of probability of successful and unsuccessful synchronization in FIG. 7a, the probability of successful synchronization is low while the probability of unsuccessful synchronization is high according to the prior art.

In comparison, with reference to the plots of probability of successful and unsuccessful synchronization in FIG. 7b, the probability of successful synchronization is high while the probability of unsuccessful synchronization is low according to the present invention.

According to the present invention as set forth above, when estimating symbol synchronization in an OQPSK demodulator applicable to a Zigbee receiver, a step of resetting a reference correlation value using a correlation value of a reception signal is added to prevent the errors in detecting symbol synchronization due to noise, thereby increasing the accuracy of symbol synchronization.

While the present invention has been shown and described in connection with the preferred embodiments, it will be apparent to those skilled in the art that modifications and variations can be made without departing from the spirit and scope of the invention as defined by the appended claims.

What is claimed is:

1. A method of estimating symbol synchronization in an Offset Quadrature Phase Shift Keying (OQPSK) demodulator, comprising steps of:

(i) correlating a digital reception signal with a preset reference symbol to acquire self-correlation values sequentially for individual symbol units;

(ii) adding, out of the self-correlation values included in a plurality of symbol periods, each of the self-correlation value in due order in an arbitrary symbol and at least one other self-correlation value set apart by a symbol period from a time point of the self-correlation value to acquire an added correlation value;

(iii) comparing between the added correlation value and the reference correlation value as to which is greater;

(iv) detecting a maximum correlation value out of added correlation values included in a plurality of subsequent symbols from a time point where the added correlation value is greater than the reference correlation value;

(v) setting a value corresponding to a predetermined proportion of the maximum added correlation value as a new reference correlation value;

(vi) comparing between a subsequent added correlation value and the new reference correlation value as to which is greater; and (vii) estimating a time point at which the self-correlation value is greater than the new reference correlation value as a time point of synchronization and outputting a symbol synchronization signal at the time point of synchronization.

2. The method according to claim 1, wherein the step (ii) comprises adding self-correlation values in the same positions of 2 to 5 symbols to acquire the added correlation value.

3. The method according to claim 1, wherein the step (ii) comprises adding self-correlation values in the same positions of 3 symbols to acquire the added correlation value.

4. The method according to claim 1, wherein in the step (iv), the number of subsequent symbols are set to be 1 to 3.

5. The method according to claim 1, wherein in the step (iv), the number of subsequent symbols are set to be 2.

6. The method according to claim 1, wherein the step (v) comprises setting a value corresponding to an arbitrary proportion, ranging from 60% to 90% of the maximum added correlation value, as the new reference correlation value.

7. The method according to claim 1, wherein the step (v) comprises setting a value corresponding to an arbitrary proportion, which is up to 75% of the maximum added correlation value, as the new reference correlation value.

* * * * *